United States Patent
Chandoor

(10) Patent No.: US 12,500,874 B2
(45) Date of Patent: *Dec. 16, 2025

(54) SECURE AND ACCURATE PROVISIONING SYSTEM AND METHOD

(71) Applicant: Visa International Service Association, San Francisco, CA (US)

(72) Inventor: Madhuri Chandoor, San Jose, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/863,873

(22) Filed: Jul. 13, 2022

(65) Prior Publication Data
US 2022/0353253 A1 Nov. 3, 2022

Related U.S. Application Data

(63) Continuation of application No. 16/645,755, filed as application No. PCT/US2018/050606 on Sep. 12, 2018, now Pat. No. 11,425,109.

(60) Provisional application No. 62/557,315, filed on Sep. 12, 2017.

(51) Int. Cl.
*H04L 9/40* (2022.01)
*H04L 9/14* (2006.01)

(52) U.S. Cl.
CPC ............ *H04L 63/0478* (2013.01); *H04L 9/14* (2013.01); *H04L 63/0435* (2013.01); *H04L 63/0807* (2013.01); *H04L 63/083* (2013.01)

(58) Field of Classification Search
CPC ... H04L 63/0478; H04L 9/14; H04L 63/0435; H04L 63/0807; H04L 63/083
See application file for complete search history.

(56) References Cited

U.S. PATENT DOCUMENTS

| | | | |
|---|---|---|---|
| 5,091,939 A | 2/1992 | Cole et al. | |
| 7,958,544 B2 | 6/2011 | Chen et al. | |
| 8,224,852 B2 | 7/2012 | Falk et al. | |
| 8,385,544 B2 | 2/2013 | Kobayashi | |
| 9,166,777 B2* | 10/2015 | Cheung | H04L 9/3226 |
| 9,722,974 B1* | 8/2017 | Fuller | H04L 9/0836 |
| 9,729,520 B2* | 8/2017 | Barton | G06F 9/544 |
| 9,979,546 B2* | 5/2018 | Van Someren | H04L 63/06 |

(Continued)

FOREIGN PATENT DOCUMENTS

WO 2016161398 10/2016

OTHER PUBLICATIONS

U.S. Appl. No. 16/645,755, "Non-Final Office Action", filed Nov. 24, 2021, 11 pages.

(Continued)

*Primary Examiner* — John B King
*Assistant Examiner* — Alex D Carrasquillo
(74) *Attorney, Agent, or Firm* — Kilpatrick Townsend & Stockton LLP

(57) ABSTRACT

A method and system for provisioning credentials is disclosed. The method includes receiving an encrypted data packet including a first passcode and credentials in encrypted form, and a second passcode. The second passcode is compared to a first passcode. If the passcodes match, then a server computer can transmit a token associated with the credentials to a service provider computer.

13 Claims, 11 Drawing Sheets

(56) References Cited

U.S. PATENT DOCUMENTS

| | | | |
|---|---|---|---|
| 10,299,118 B1* | 5/2019 | Karachiwala | H04L 67/55 |
| 10,776,479 B2* | 9/2020 | Chatterton | G06Q 20/40 |
| 2003/0172272 A1* | 9/2003 | Ehlers | G06Q 20/425 |
| | | | 713/170 |
| 2004/0187018 A1* | 9/2004 | Owen | H04L 9/321 |
| | | | 713/184 |
| 2007/0043681 A1* | 2/2007 | Morgan | G06Q 20/3674 |
| | | | 705/67 |
| 2008/0015986 A1* | 1/2008 | Wright | G06Q 30/00 |
| | | | 705/44 |
| 2008/0222696 A1* | 9/2008 | Nicodemus | H04L 63/102 |
| | | | 726/1 |
| 2009/0100032 A1 | 4/2009 | Jones et al. | |
| 2009/0172402 A1* | 7/2009 | Tran | G06Q 20/388 |
| | | | 705/40 |
| 2011/0202984 A1 | 8/2011 | Hird et al. | |
| 2013/0166918 A1* | 6/2013 | Shahbazi | H04L 9/0863 |
| | | | 713/183 |
| 2015/0039908 A1 | 2/2015 | Lee et al. | |
| 2015/0082032 A1 | 3/2015 | Bruce et al. | |
| 2015/0113283 A1* | 4/2015 | Corella | G06F 21/32 |
| | | | 713/185 |
| 2015/0341335 A1 | 11/2015 | Camenisch et al. | |
| 2016/0048833 A1* | 2/2016 | Huxham | G06Q 20/3821 |
| | | | 705/76 |
| 2016/0261411 A1* | 9/2016 | Yau | G06Q 20/38215 |
| 2016/0308678 A1 | 10/2016 | Bhatnagar | |
| 2017/0331817 A1* | 11/2017 | Votaw | G06F 21/42 |
| 2019/0182230 A1* | 6/2019 | Wong | H04W 12/068 |

OTHER PUBLICATIONS

U.S. Appl. No. 16/645,755, "Notice of Allowance", filed Apr. 18, 2022, 9 pages.

PCT/US2018/050606, "International Preliminary Report on Patentability", Mar. 26, 2020, 11 pages.

PCT/US2018/050606, "International Search Report and Written Opinion", Jan. 9, 2019, 14 pages.

\* cited by examiner

SECURE AND ACCURATE PROVISIONING SYSTEM AND METHOD

CROSS-REFERENCES TO RELATED APPLICATIONS

This application is a continuation of U.S. patent application Ser. No. 16/645,755, filed on Mar. 9, 2020, which is a National Stage of International Application No. PCT/US2018/050606. International Filing Date Sep. 12, 2018, which claims the benefit of the filing date of U.S. Provisional Application No. 62/557,315, filed on Sep. 12, 2017, The disclosures of the above-named applications are herein incorporated by reference in their entireties.

BACKGROUND

Systems have been created to authenticate a user in order to initiate provision credentials to a service provider application on a mobile device operated by the user. In some cases, many entities can be involved in this process. Such entities may include a processing computer, an authorizing entity computer, a service provider computer, and a user device.

A problem that exists with respect to existing provisioning methods is that it is difficult to ensure that the same person that is authenticated when the provisioning is initiated, is the same person that is operating the mobile device that is receiving the access data that is being provisioned. Another problem that exists with respect to existing provisioning methods is that there are many message transmissions. Increasing the number of messages that are transmitted between entities increases the likelihood of man-in-the-middle attacks, and also consumes a significant amount of computing resources in a computer network.

Embodiments of the invention address these and other problems individually and collectively.

SUMMARY

One embodiment of the invention includes receiving, by a service provider computer, an encrypted data packet comprising credentials and a first passcode; receiving, by the service provider computer, a second passcode from a user device; transmitting, by the service provider computer, the second passcode and the encrypted data packet to a processing computer, to cause the processing computer to decrypt the encrypted data packet to obtain the credentials and the first passcode, compare the first passcode to the second passcode, and provide to the service provider computer access data when the first and second passcodes match; and receiving, by the service provider computer from the processing computer, the access data associated with the credentials.

Another embodiment of the invention includes a service provider computer comprising: a processor; and a computer readable medium, coupled to the processor, the computer readable medium comprising code, executable by the processor to implement a method comprising: receiving an encrypted data packet comprising credentials and a first passcode; receiving a second passcode from a user device; transmitting, by the service provider computer, the second passcode and the encrypted data packet to a processing computer, to cause the processing computer to decrypt the encrypted data packet to obtain the credentials and the first passcode, compare the first passcode to the second passcode, and provide to the service provider computer access data when the first and second passcodes match; and receiving, by the service provider computer from the processing computer, the access data associated with the credentials Another embodiment of the invention is directed to a method comprising: receiving, by the processing computer, from a service provider computer, an encrypted data packet comprising credentials and a first passcode in encrypted form, and a second passcode; decrypting, by the processing computer, the encrypted data packet to obtain the credentials and the first passcode; comparing, by the processing computer, the first passcode to the second passcode; determining, by the processing computer that the first passcode and the second passcode match; and transmitting, by the processing computer, access data associated with the credentials to the service provider computer.

Another embodiment of the invention is directed to a processing computer comprising: a processor; and a computer readable medium. The computer readable medium comprises code, executable by the processor for implementing a method comprising: receiving, from a service provider computer, an encrypted data packet comprising credentials and a first passcode in encrypted form, and a second passcode; decrypting, the encrypted data packet to obtain the credentials and the first passcode; comparing the first passcode to the second passcode; determining that the first passcode and the second passcode match; and transmitting access data associated with the credentials to the service provider computer.

Further details regarding embodiments of the invention can be found in the Detailed Description and the Figures.

DETAILED DESCRIPTION

Figure 1:
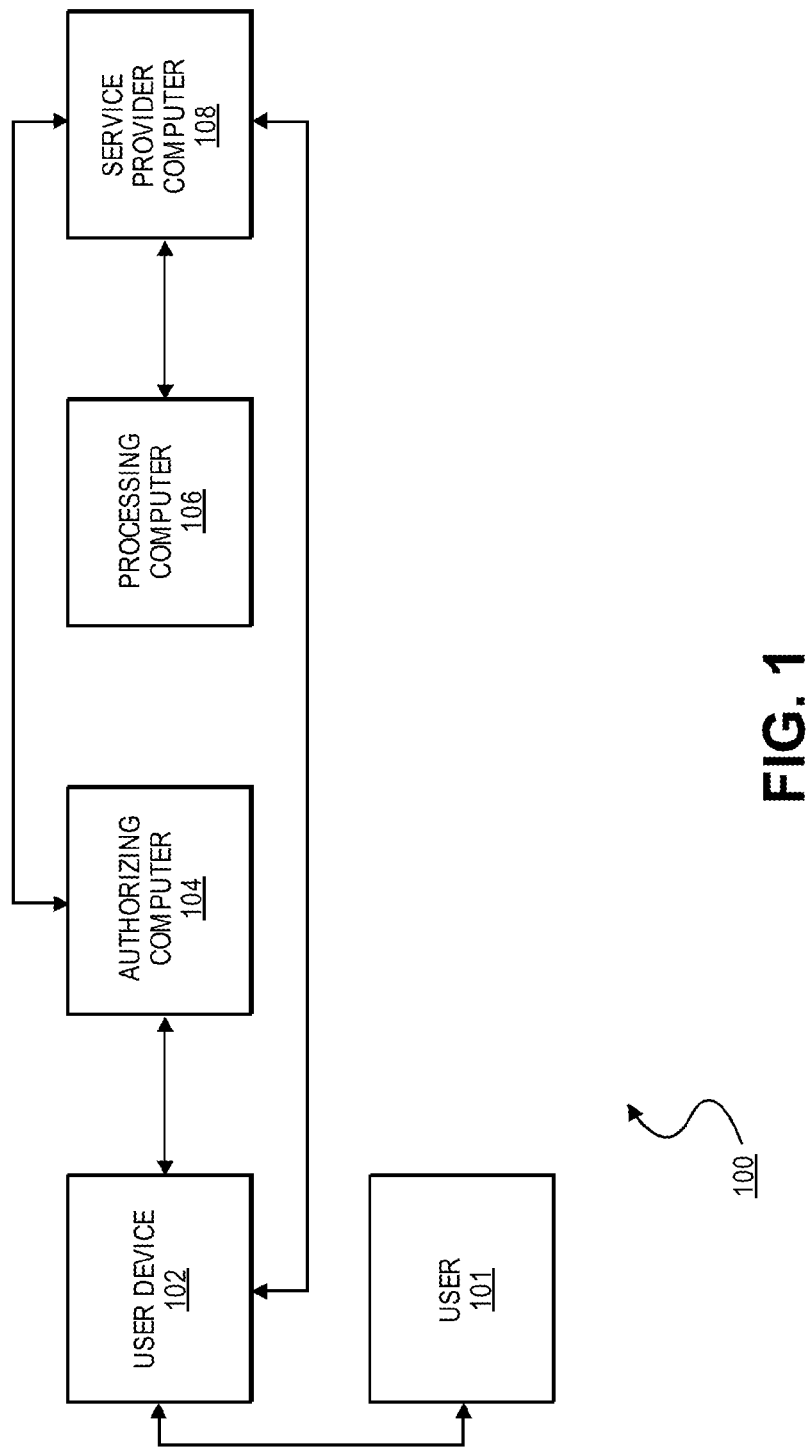
FIG. 1 shows a block diagram of a system according to an embodiment.

Prior to discussing embodiments of the invention, some terms can be described in further detail.

A "user device" may be any suitable device that can interact with a user device (e.g., a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose.

"Authentication data" may include any data suitable for authenticating a user or mobile device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "electronic wallet" or "digital wallet" can include an electronic device that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "service provider" may be an entity that can provide a resource such as goods, services, information, and/or access typically through a service provider computer. Examples of a service provider includes merchants, digital wallets, payment processors, etc.

A "user" may include an individual or a computational device. In some embodiments, a user may be associated with one or more personal accounts and/or mobile devices. In some embodiments, the user may be a cardholder, account holder, or consumer.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a system 100 comprising a number of components according to an embodiment of the invention. The system 100 comprises a user device 102 which may be associated with a user 101, an authorizing computer 104 that may hold an account of the user 101, a processing computer 106, and a service provider computer 108. The service provider computer 108 may operate or be affiliated with a service provider application on the user device 102 that is used by the user 101. The service provider application can be a digital wallet application or an access application such as a transit application.

The user device 102, the authorizing computer 104, the processing computer 106, and the service provider computer 108 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

In some embodiments, the user device 102 may include a service provider application such as a mobile wallet application, payment application, or access application that may be provisioned with access data to enable the user device 102 to conduct access transactions.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

The authorizing computer 104 can be a computer that is associated with an authorizing entity (e.g., a bank), a secure data access provider, an entity that can provide access to a location, or the like. The authorizing computer 104 may include a processor and a computer readable medium coupled to the processor, the computer readable medium comprising code, executable by the processor for performing the functions described below. The authorizing computer 104 may be configured to transmit messages and passcodes to the user device 102, transmit messages and encrypted data packets to the service provider computer 108, etc.

The processing computer 106 may be a server computer. The processing computer 106 may include a processor and a computer readable medium coupled to the processor. The computer readable medium may comprise code, executable by the processor to perform the functions described herein. In some embodiments, the server computer may be coupled to a database and may include any suitable hardware, software, other logic, or combination of the preceding for decrypting encrypted data packets, decrypting double encrypted data packets, decrypting first encrypted results, storing key sets, determining if first and second passcodes match, etc.

The service provider computer 108 may perform functions that may be embodied by computer code, residing on computer readable media. The service provider computer 108 may include a processor and a computer readable medium coupled to the processor. The computer readable medium comprising code, executable by the processor for performing the functions described herein. The service provider computer 108 may be configured to transmit messages, receive messages, and determine data. Examples of the service provider computers may include application server computers such as electronic wallet servers, digital wallet servers, Web servers such as merchant Web servers, processor servers such as payment processor servers, etc.

Figure 2:
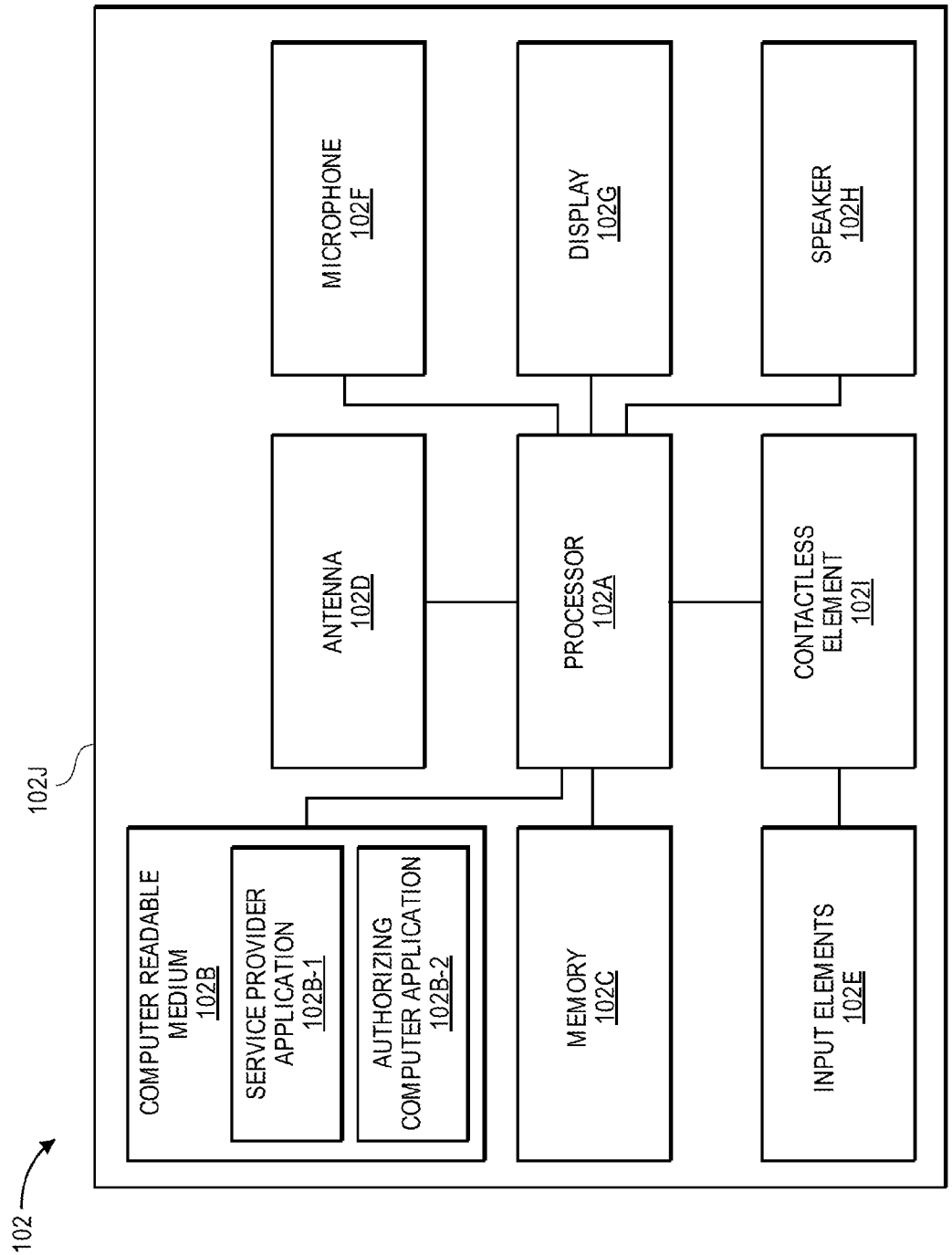
FIG. 2 shows a block diagram of user device according to an embodiment.

FIG. 2 shows a block diagram of a user device 102 according to an embodiment. In some embodiments, the user device 102 may be a payment device that can be used to make payments or a device which can allow a user to gain access to a location. The exemplary user device 102 may comprise a computer readable medium 102B and a memory 102C that can be present within the body 102J of the user device 102. The body 102J may be in the form a plastic substrate, housing, or other structure. In some cases, the memory 102C may be a secure element, and/or may also store information such as access data such as tokens, PANs, tickets, etc. Information in the memory 102C may be transmitted by the user device 102 to another device using an antenna 102D or contactless element 102I.

The computer readable medium 102B may comprises code, executable by the processor for implementing methods according to embodiments. The computer readable medium 102B may contain a service provider application 102B-1 and an authorizing computer application 102B-2. The service provider application 102B-1 can allow the user device 102 to communicate with a service provider computer 108. It can provide functions provided by a service provider. Examples of service provider applications can include digital wallet applications, payment applications, merchant applications, transit applications, applications to access secure data, etc. The authorizing computer application 102B-2 can allow the user device 102 to communicate with an authorizing computer 104. It can provide functions provided by an authorization entity. Examples of authorization entities include banks, payment processors, administrative authorities, governmental entities, etc.

In some embodiments, the user device 102 may further include a contactless element 102I, which is typically implemented in the form of a semiconductor chip (or other data storage element) with an associated wireless transfer (e.g., data transmission) element, such as an antenna. Data or control instructions that are transmitted via a cellular network may be applied to the contactless element 102I by means of a contactless element interface (not shown). Contactless element 102I may be capable of transferring and receiving data using a short range wireless communication capability. Thus, the user device 102 may be capable of communicating and transferring data or control instructions via both cellular network (or any other suitable wireless network—e.g. the Internet or other data network) and short range communications.

The user device 102 may also include a processor 102A (e.g., a microprocessor) for processing the functions of the user device 102 and a display 102G to allow a user to view information. The user device 102 may further include input elements 102E (e.g., a touchscreen, keyboard, touchpad, sensors such as biometric sensors, etc.), a speaker 102H, and a microphone 102F. The user device 102 may also include an antenna 102D for wireless data transfer.

Figure 3:
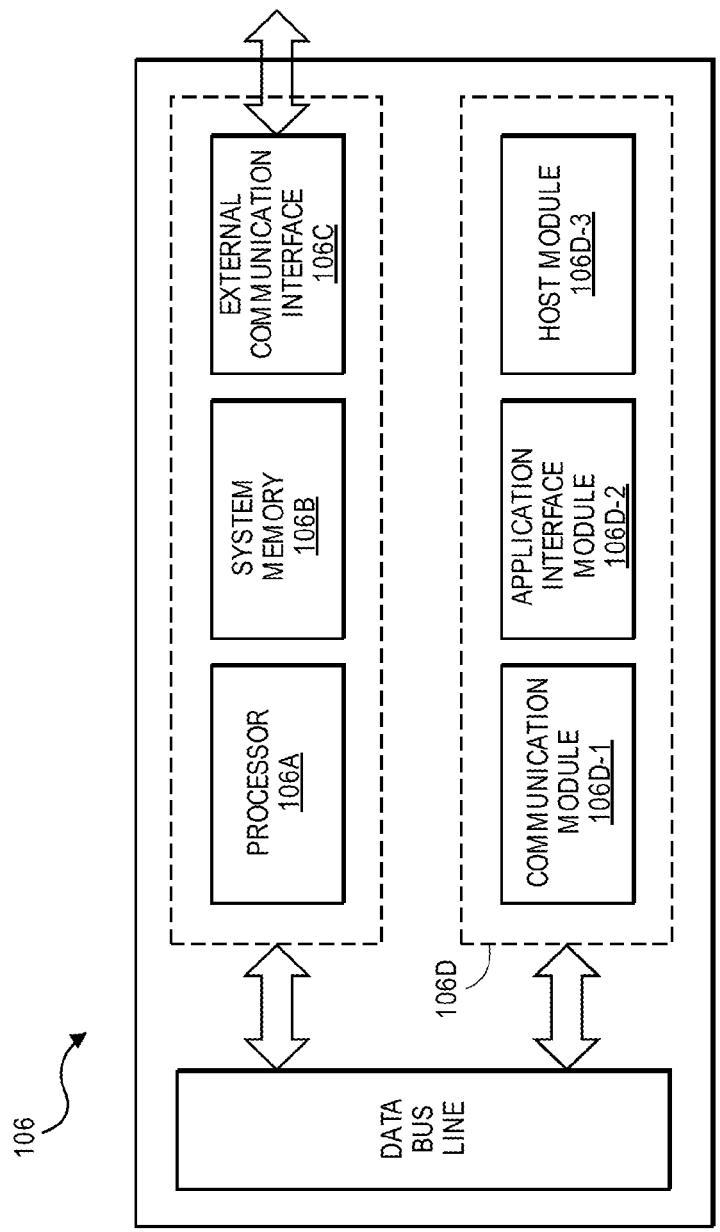
FIG. 3 shows a block diagram of a service provider computer according to an embodiment.

FIG. 3 shows a block diagram of a service provider computer 106 according to an embodiment. The service provider computer 106 may comprise a processor 106A, which may be coupled to a system memory 106B and an external communication interface 106C. A computer readable medium 106D may also be operatively coupled to the processor 106A.

Communication interface 106C may be any suitable combination of hardware and software that enables data to be transferred to and from service provider computer 106. Communication interface 106C may enable the service provider computer 106 to communicate data to and from another device (e.g., resource provider computer, authorizing computer, etc.). Some examples of communication interface 106C may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by communication interface 106C may include Wi-Fi.

Data transferred via communication interface 106C may be in the form of signals which may be electrical, electromagnetic, optical, or any other signal capable of being received by the external communications interface (collectively referred to as "electronic signals" or "electronic messages"). These electronic messages that may comprise data or instructions may be provided between communication interface 106C and other devices via a communications path or channel. Any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 106D may comprise a number of software modules including a communication module 106D-1, an application interface module 106D-2, and a host module 106D-3.

The communication module 106D-1 may comprise code that causes the processor 106A to generate messages, forward messages, reformat messages, and/or otherwise communicate with other entities.

The application interface module 106D-2 can contain code, executable by the processor 106A, to interact with a service provider application on a user device.

The host module 106D-3 may comprise code, executable by the processor 106A to generate a host site such as a Web site hosted by a service provider. If a host site is used, the host site could also be provisioned with access data.

Figure 4:
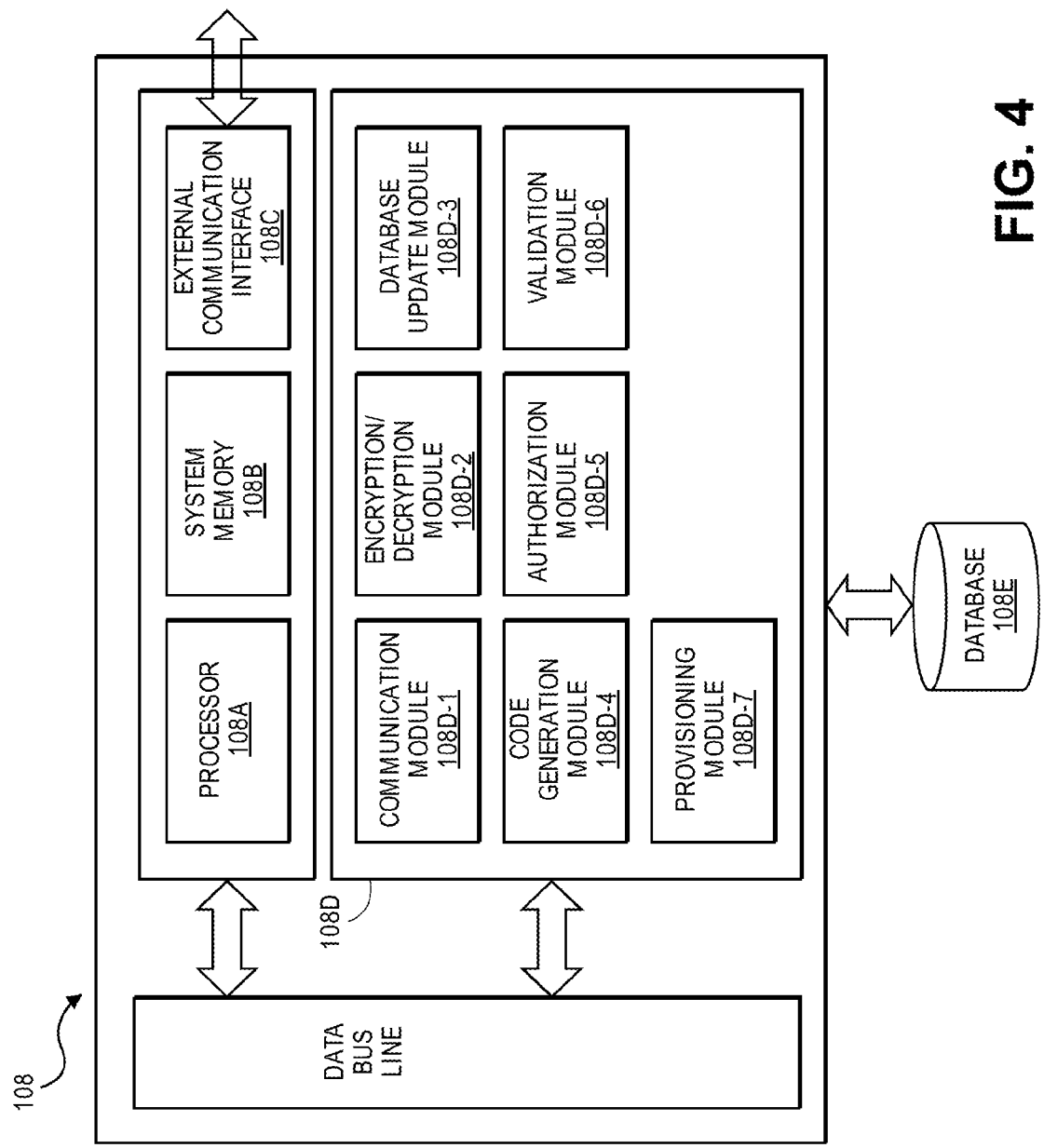
FIG. 4 shows a block diagram of a processing computer according to an embodiment.

The computer readable medium 106D may comprise code, executable by the processor 106A to implement a method comprising: receiving an encrypted data packet comprising credentials and a first passcode; receiving a second passcode from a user device; transmitting, by the service provider computer, the second passcode and the encrypted data packet to a processing computer, to cause the processing computer to decrypt the encrypted data packet to obtain the credentials and the first passcode, compare the first passcode to the second passcode, and provide to the service provider computer access data when the first and second passcodes match; and receiving, by the service provider computer from the processing computer, the access data associated with the credentials FIG. 4 shows a block diagram of a processing computer 108 according to an embodiment. The processing computer 108 may comprise a processor 108A, which may be coupled to a system memory 108B and an external communication interface 108C. A computer readable medium 108D may also be operatively coupled to the processor 108A. A database 108E may also be in operative communication with the processor 108A. The database 108E may contain access data such as tokens and/or account data, as well as mappings between access data, credentials, and/or communication device identifiers such as phone numbers, IP addresses, device identifiers, etc.

The computer readable medium 108D may comprise a number of software modules including a communication module 108D-1, an encryption/decryption module 108D-2, a database update module 108D-3, a code generation module 108D-4, an authorization module 108D-5, a validation module 108D-6, and a provisioning module 108D-7.

The communication module 108D-1 may comprise code that causes the processor 108A to generate messages, forward messages, reformat messages, and/or otherwise communicate with other entities.

The encryption/decryption module 106D-2 may include any suitable encryption/decryption algorithms to encrypt data in embodiments of the invention. Suitable data encryption/decryption algorithms may include DES, triple DES, AES, etc. It may also store encryption keys that can be used with such encryption/decryption algorithms. The encryption module 106D-2 may utilize symmetric or asymmetric encryption techniques to encrypt and/or verify data. Cryptographic keys that may be used by the encryption/decryption module 106D-2 may be securely stored in the system memory 108B.

The database update module 108D-3 may comprise code that causes the processor 108A to update an account database 108E. The database 108E may be updated with account information, token to credential to device information mapping, provisioning information, etc.

The code generation module 108D-4 may comprise code that causes the processor 108A to generate codes or receive codes. As will be explained in detail below, codes can be received from an authorizing computer or may be generated independently from data from the authorization computer or through the use of shared secrets.

The authorization module 108D-5 may comprise code that can cause the processor 108A to evaluate authorization request messages for transactions and determine if the transactions should be authorized. The authorization module 108D-5 may also include code for routing or modifying authorization request and response messages as they pass between various parties such as issuers and acquirers.

The validation module 108D-6 may include any suitable code for validating codes or data. In some embodiments, the validation module 108D-6 may validate encrypted data packets received from a service provider computer 108. The validation module 108D-6 may also be programmed to compare first and second codes to determine if a match is present.

The provisioning module 108D-7 can include code, executable by the processor 108A to provision user devices with access data.

In some embodiments, the computer readable medium 108D may comprise code, executable by the processor to implement a method comprising: receiving, from a service provider computer, an encrypted data packet comprising credentials and a first passcode in encrypted form, and a second passcode; decrypting, the encrypted data packet to obtain the credentials and the first passcode; comparing, the first passcode to the second passcode; determining, that the first passcode and the second passcode match; and transmitting, access data associated with the credentials to the service provider computer.

Figure 5:
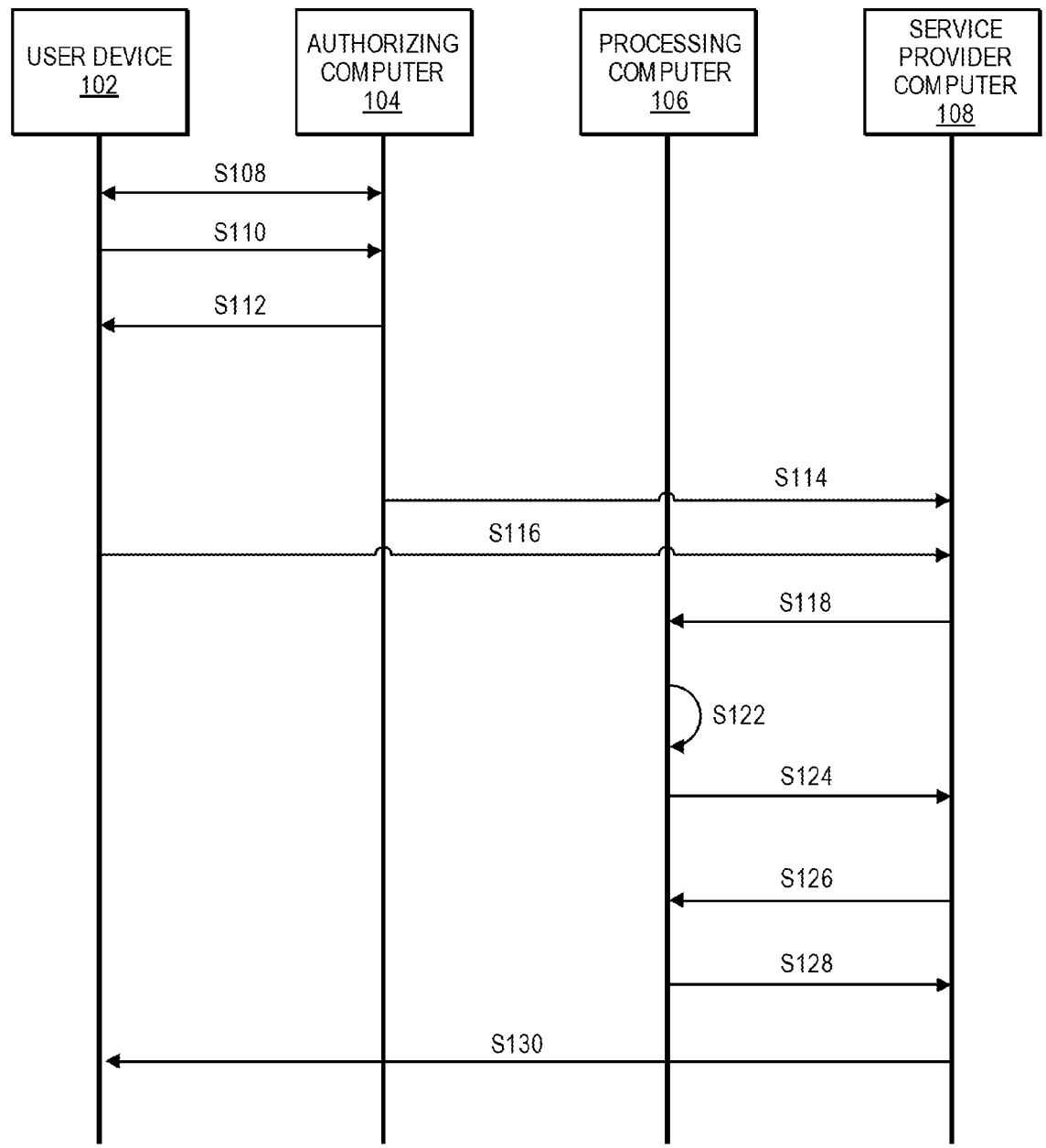
FIG. 5 shows a flow diagram depicting a provisioning method according to an embodiment.

FIG. 5 shows a flow diagram depicting securely provisioning access data to a service provider computer 108 according to an embodiment. The service provider computer 108 can then provide the access data to a service provider application on the user device 102.

At step S108, a user of the user device 102 may wish to access an authorizing entity application 102B-2 (e.g., a mobile banking application) on the user device 102 to push provision access data to service provider application 102B-1 (e.g., a digital wallet application) on the user device 102. The user of the user device 102 may supply the necessary credentials, such as a username and password to access the authorizing entity application 102B-2.

At step S110, the user 101 may transmit a request message to the authorizing computer 104, requesting that the service provider computer 108 be provisioned with access data, so that it can be provided to a service provider application 102B-1 on the user device 102. Once the user of the user device 102 is ready to send the request message, the user may select a "Send," "Select a digital wallet," "+," or any other suitable option presented on a display of the user device 102. An example user device display during this step is shown in displays 502 and 504 of FIG. 7A.

Figure 7A:
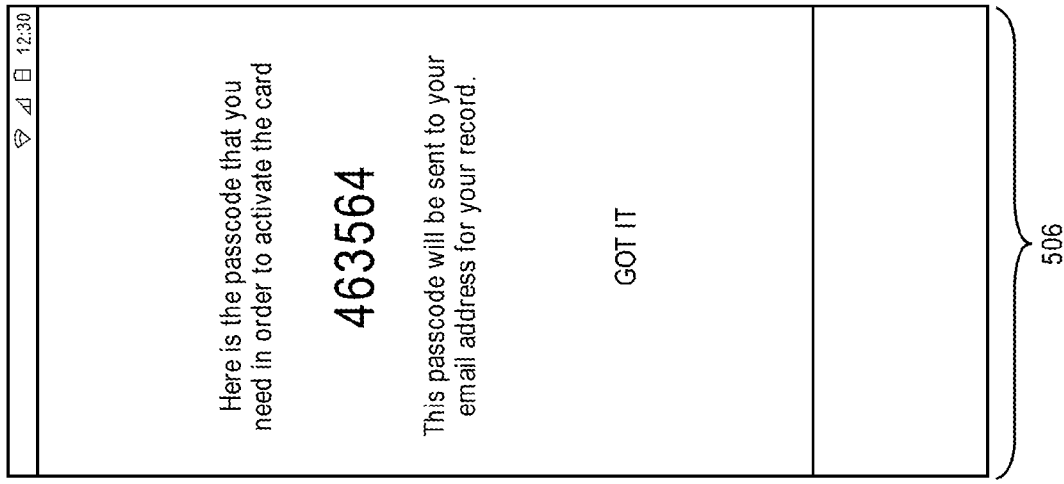
FIGS. 7A-7C show examples user device displays.
Figure 7A:
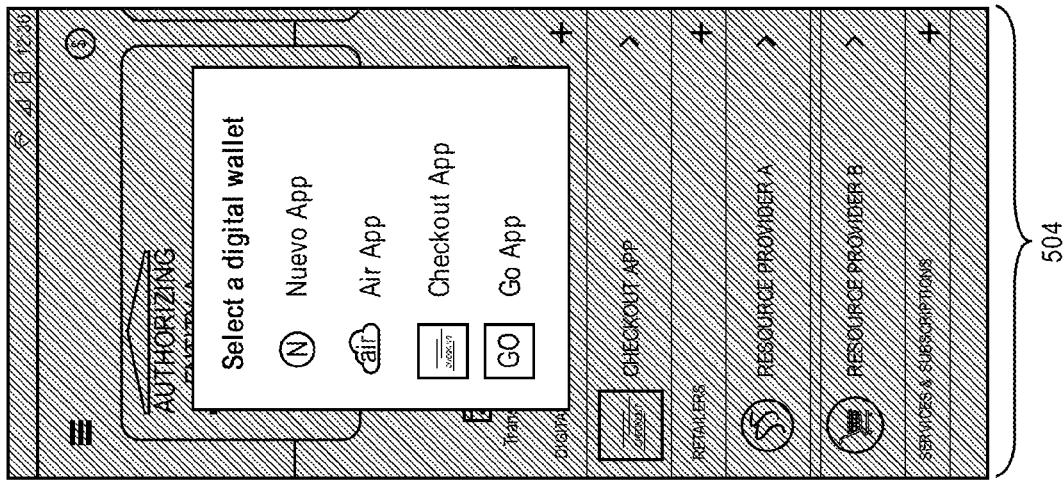
Figure 7A:
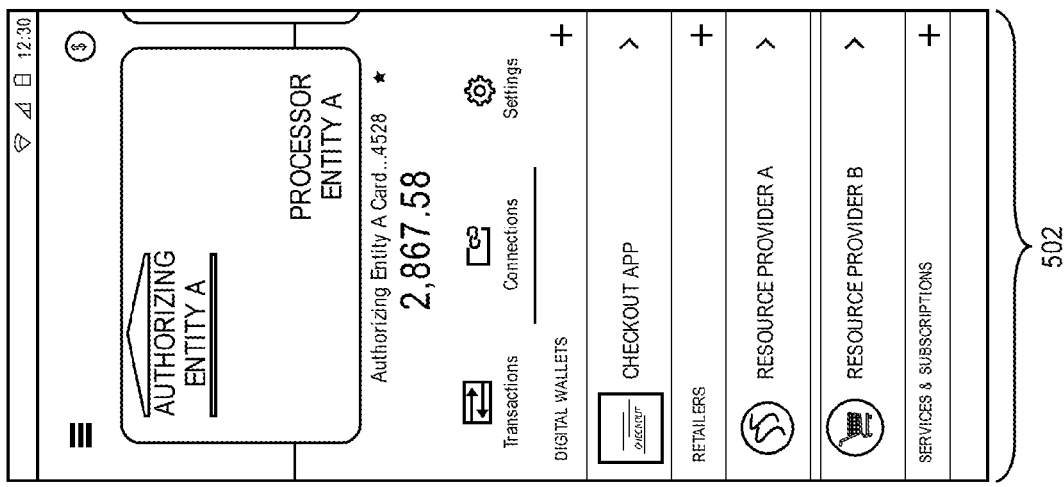

In some embodiments, after receiving the request message from the user device 102, the authorizing computer 104 may provide a list of available service providers or service provider applications that can be provisioned with access data (e.g., a token) associated with credentials held by the authorizing computer 104. FIG. 7A display 504 portrays an example list available to a user 101. In this embodiment, the user 101 may select from a list of four different digital wallets. If the access data is a token, then each of the digital wallets may have a token requestor identifier that is stored at the authorizing computer 104. Before or after selecting the service provider, the user 101 may also select a credential to provision to the selected service provider or service provider application. If the access data is a token, the authorizing computer 104 may contact the processing computer 106 to determine if a token already is present for the user of the user device 102 with the selected service provider.

At step S112, the authorizing computer 104 may transmit a response message, comprising a second passcode, to the user device 102. In some embodiments, the response message may include a text description, instructions, a time to live for the second passcode or other relevant information. The response message may be in the form of a text message, application notification, email, and/or the like. 506 in FIG. 7A portrays an example passcode displayed on the user device 102. In this embodiment, the passcode will also be sent to the user's email address. The passcode may be in any suitable form and may include any suitable number of types of characters (e.g., letters or numbers).

The second passcode may be generated or otherwise obtained by the authorizing computer 104. A corresponding first passcode can be generated and transmitted to the processing computer 106 and stored therein. In other embodiments, the first code can be derived by the processing computer 106 using information from the authorizing computer 104, or it may be derived from a shared secret with the authorizing computer 104.

At step S114, the authorizing computer 104 may generate and transmit an encrypted data packet comprising credentials and a first passcode formed by encrypting this data with a first key of a first key set to the service provider computer 108. The first key of the first key set is used by the authorizing computer 104 to encrypt the data packet. In some embodiments, the authorizing computer 104 may share the first key set with the processing computer 106, so that the processing computer 106 can be decrypted using a key in the first key set. The authorizing computer 104 may also send the user's name, e-mail address or mobile phone number along with the encrypted data packet. This information can be used by the service provider computer 108 to identify and communicate with the user device 102.

In some embodiments, the service provider computer 108 may optionally request a validation of the encrypted data packet from the processing computer 106. If valid, the processing computer 106 may transmit data about the user (e.g., the user's name, e-mail address, mobile phone number, etc.) to the service provider computer 108. If invalid, the processing computer 106 may terminate the connection and relay the termination decision to the authorizing computer 104 and/or the user device 102.

Figure 7B:
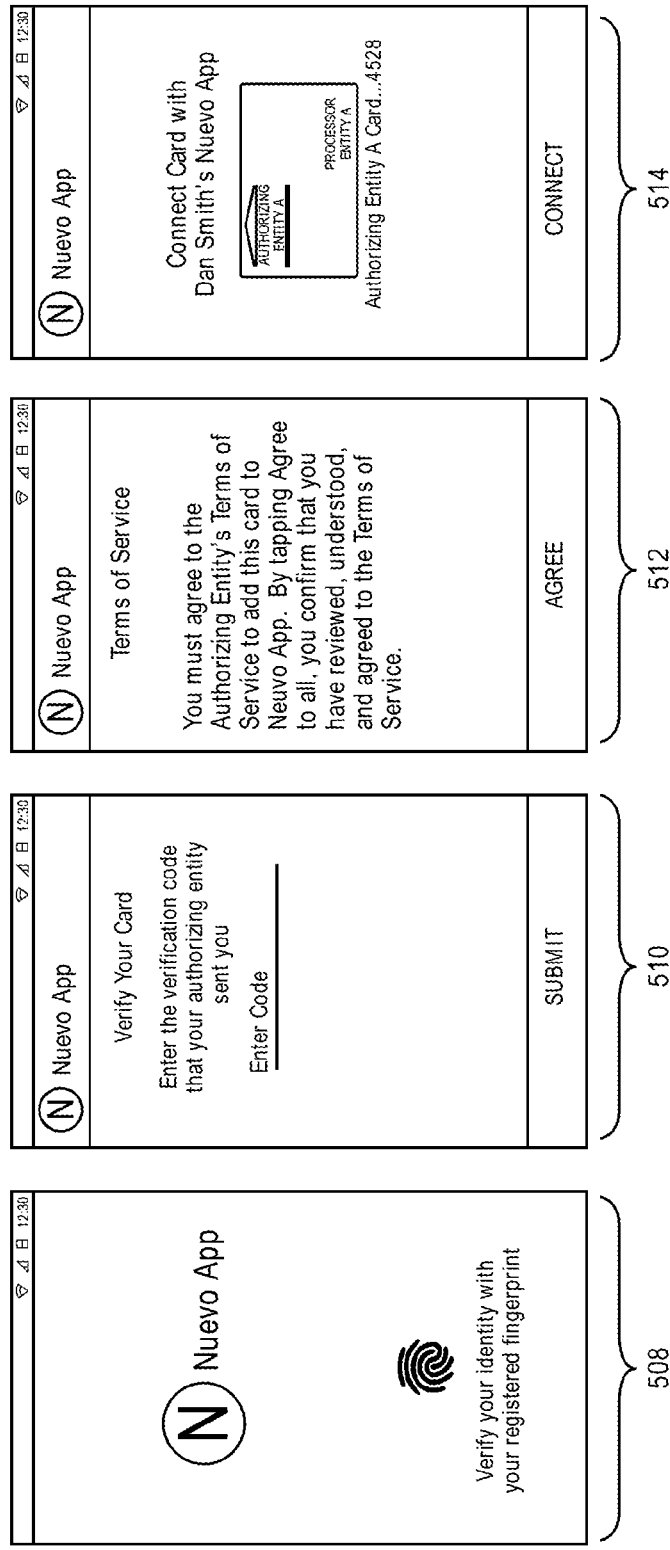

In some embodiments, after receiving the encrypted data packet and/or data about the user device 102 at the service provider computer 108, the service provider computer 108 may provide information to the user via the service provider application 102B-1 about either signing up for a new account or signing in to an existing account. The user of the user device 102 may complete the sign in or sign up using the service provider application 102B-1 on the user device 102. 508 in FIG. 7B shows a way of signing in using a biometric scanner. In this case, the user verifies their identity with their fingerprint. The user may provide enrollment information to the service provider computer 108 via the service provider application 102B-1 on the user device 102. The service provider computer 108 may then prompt the user via the user device 102 to submit the second passcode to the service provider computer 108 through the service provider application 102B-1 to connect with the service provider computer 108 or other recognized means of communication as shown in 510.

In other embodiments, the service provider computer 108 may transmit terms and conditions to the user device 102. The user is given the option to accept or reject the terms and conditions. The user device 102 may then send the corresponding "Agree," "Reject," or other appropriate response message to the service provider computer 108. In some embodiments, the steps of accepting or rejecting the terms and conditions may occur at any point after step S114. 512 of FIG. 7B shows an example user device 101 displaying the "Terms of Service."

At step S116, the user may use the user device 102 to transmit the second passcode to the service provider computer 108. The user device 102 may access the service provider application 102B-1 to connect to the service provider computer 102A in order to transmit the second passcode, as shown in 510 in FIG. 7B. In some embodiments, the transmission may include data in addition to the second passcode, such as, a text description, instructions, or other relevant information.

In other embodiments, if the second passcode has expired, due to a given time to live or other mechanism, then the service provider application 102B-1 may generate an error message. The error message may contain information useful to the user 101, pertaining to needing a new passcode, connection issues, or other current and relevant issues preventing completion of the provisioning process.

At step S118, the service provider computer 108 may transmit the second passcode and the encrypted data packet to the processing computer 106. The second passcode and the encrypted data packet may be transmitted in one transmission. In other embodiments, the service provider computer 108 may first transmit the second passcode, and then transmit the encrypted data packet. In another embodiment, the service provider computer 108 may first transmit the encrypted data packet, and then the second passcode to the processing computer 106. If the service provider computer 108 receives either the second passcode or the encrypted data packet before it receives the other, the service provider computer 108 may store the received data in a secure memory storage, until it receives the other.

In other embodiments, the service provider computer 108 may transmit the enrollment information provided by the user along with the encrypted data packet and the second passcode to the processing computer 106.

At step S122, the processing computer 106 may decrypt the encrypted data packet using the second key of the first key set in order to retrieve the credentials (e.g., a PAN) and the first passcode. The processing computer 106 may determine if the first passcode is the same as the second passcode. If the first passcode is the same as the second passcode, then the processing computer 106 may proceed to step 124. If the first passcode is not the same as the second passcode, then the processing computer 106 may terminate the communication connection with the service provider computer 108. The processing computer 106 may relay the termination information with the authorizing computer 104.

In some embodiments, the processing computer 106 may adjust any relevant risk indicators. For example, if the first passcode matches the second passcode the risk indicators will be set to low. The processing computer 106 may then transmit the risk indicators to the authorizing computer 104.

In step S124, the service provider computer 108 can receive an enrollment ID if the processing computer 106 determines that the first and second passcodes match.

In step S126, upon receiving the enrollment ID, the service provider computer 108 may transmit a confirmation to provision message to the processing computer 106.

Note that steps S124 and S126 are optional, and the process could proceed directly to step S128 from step S122.

At step S128, the processing computer 106 may transmit the access data to the service provider computer 108. The transmission may also include a text description, instructions, or other relevant information. The service provider computer 108 may also store the access data.

At step S130, the access data may be provided to the service provider application 102B-1 in the user device 102.

Figure 7C:
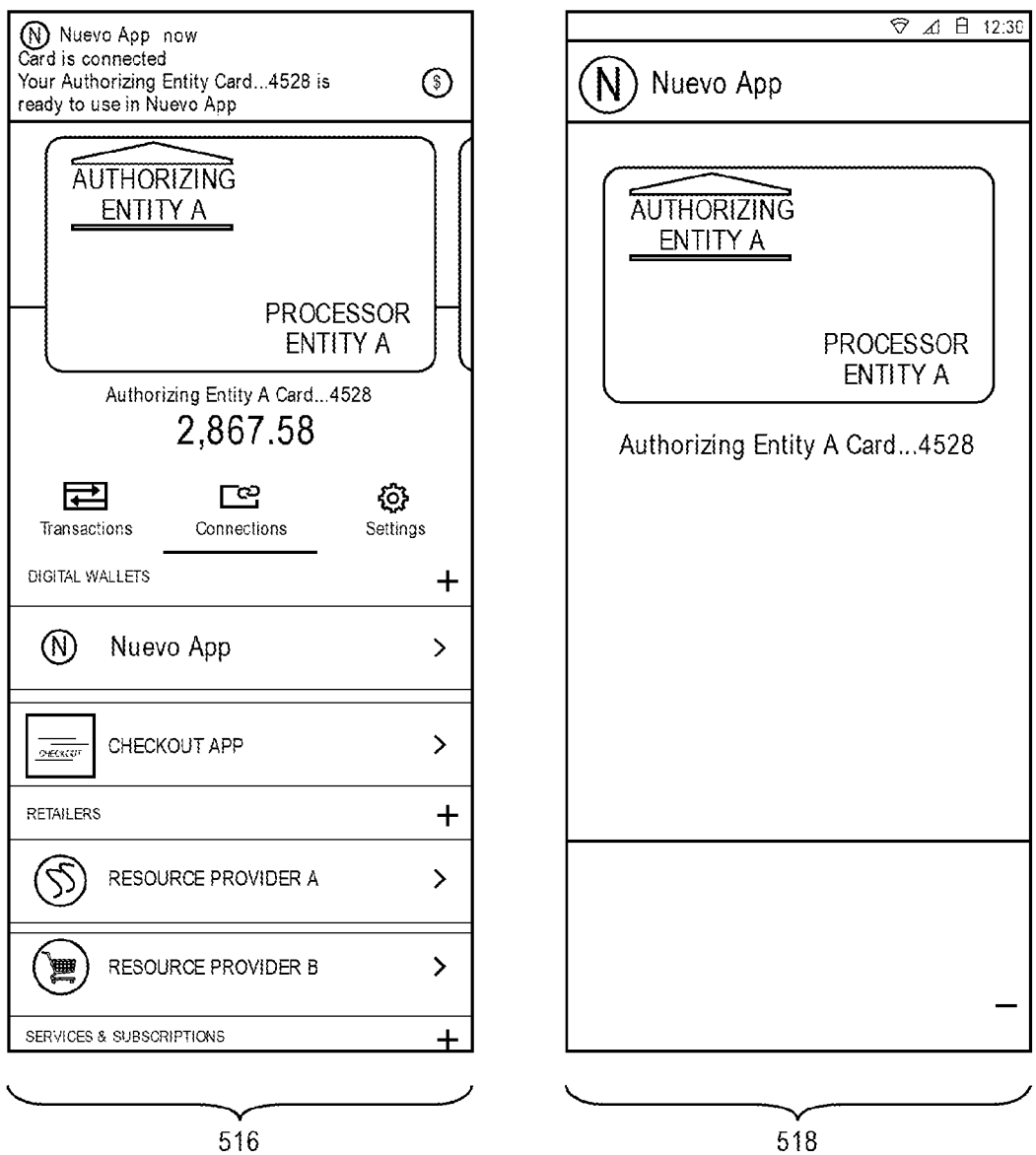

As noted above, in some embodiments, the service provider computer 108 may confirm the acquisition of the credentials in a confirmation message by sending the confirmation message to the processing computer 106, the authorizing computer 104, and/or the user device 102. 516 and 518 in FIG. 7C show example displays of the user 101 successfully adding the prior requested digital wallets. In this embodiment, the confirmation states "Card is connected." The confirmation message to the user device 102 may include step-up options. The user may be required to choose a verification method and then verify themselves. Once verified, the processing computer 106 may confirm access data (e.g., token) activation status.

The service provider computer 108 may then confirm the access data activation status to the user device 102. The user of the user device 102 may also be redirected back to the authorizing entity application 102B-2. In some embodiments, the processing computer 106 may push the provision status and the access data status to the authorizing computer 104.

In the message flows illustrated in FIG. 5, a session identifier may be present in each of the messages to identify the various messages as being part of a single provisioning transaction.

Figure 6:
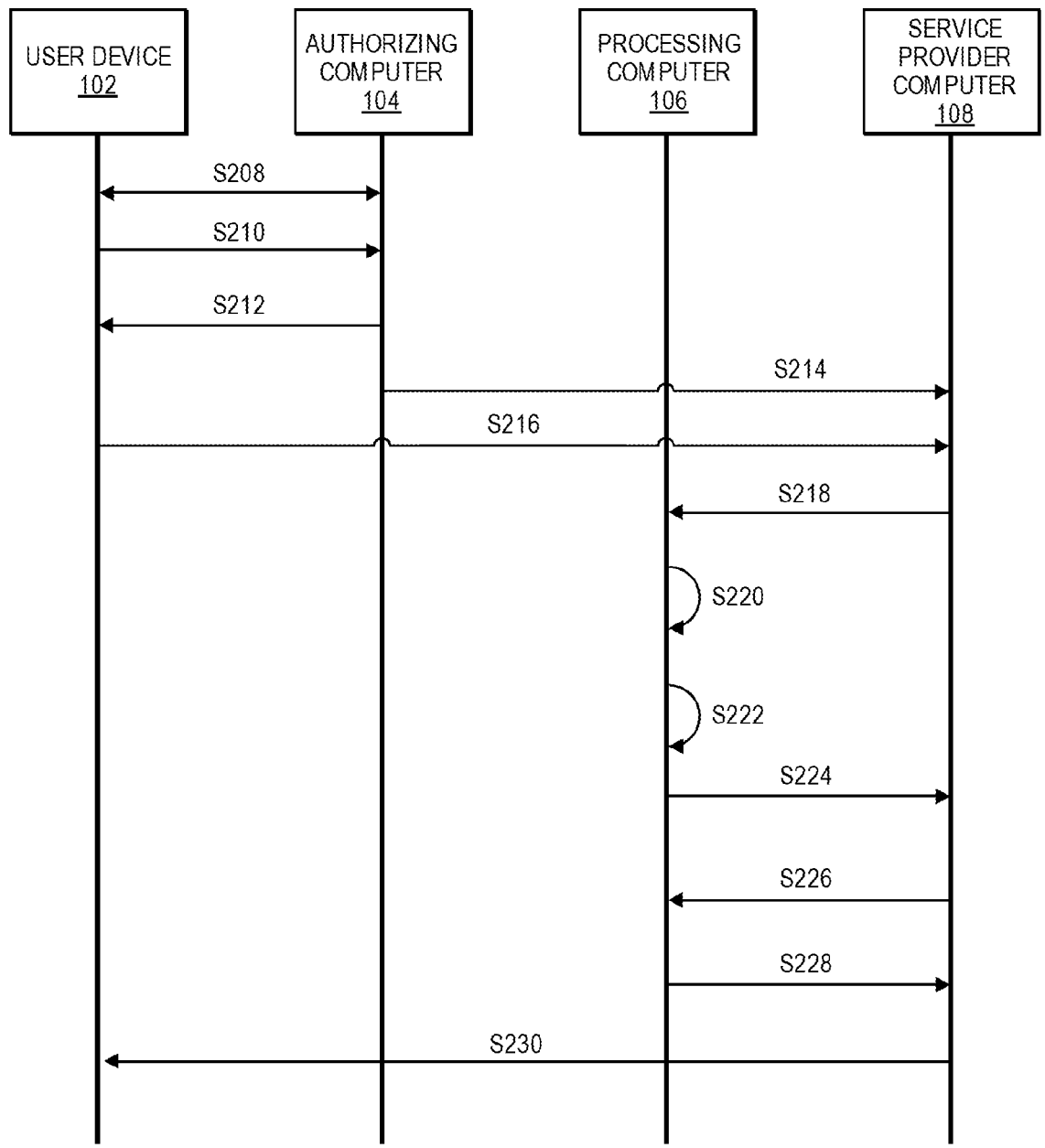
FIG. 6 shows a flow diagram depicting a provisioning method according to another an embodiment. The embodiment in FIG. 6 includes the use of multiple encrypted data packets.

FIG. 6 shows a flow diagram depicting a method of securely provisioning credentials to a service provider computer according to an embodiment.

At steps S208, S210, and S212, the process described with respect to steps S108, S110, and S212 in FIG. 5 may be performed, and corresponding descriptions are incorporated herein.

At step 214, the authorizing computer 104 may transmit a double encrypted data packet, formed by encrypting the credentials and the first password by a first key of a first key set to form a first encrypted result, and then encrypting the first encrypted result with a first passcode, to the service provider computer 108. In some embodiments, the double encrypted data packet may be encrypted any number of times.

At step S216, a process similar to that described in step S116 in FIG. 5 may be performed, and corresponding descriptions are incorporated herein.

At step S218, the service provider computer 108 may transmit the second passcode and the double encrypted data packet to the processing computer 106.

At step S220, the processing computer 106 may decrypt the double encrypted data packet with the second passcode or a derivative thereof (e.g., a hash or other computed value) to obtain the first encrypted result. In some embodiments, the processing computer 106 may decrypt the double encrypted data packet any number of times.

At step S222, the processing computer 106 decrypts the first encrypted result with a second key of the first key set to obtain the credentials.

At steps S224, S226, S228, and S230 can include processes similar to those described above with respect to steps S124, S126, S128, and S130 above, and corresponding descriptions are incorporated herein. Note that steps S224 and S226 are optional, and the process could proceed directly to step S228 from step S222.

FIG. 7A shows an example user device 102 display during certain points in the method illustrated in FIG. 5. 502 depicts an application on a user device 102 where the user 101 may select a new digital wallet connection for a chosen card. 504 depicts a display on the user device 102 where the user 101 may select a digital wallet. 506 depicts the user 101 receiving the second passcode on the user device 102.

FIG. 7B shows an example user device 102 display during certain points in the method illustrated in FIG. 5. 508 depicts an application on a user device 102 where the user 101 may sign in to an existing account corresponding to the prior selected digital wallet. 510 depicts a display on the user device 102 where the user 101 may enter the prior received second passcode and transmit it to the service provider computer 108. 512 depicts a display on the user device 102 where the user 101 receives the terms of service from the service provider computer 108. The user 101 may be prompted to agree with the terms of service. 514 depicts a display on the user device 102 where the user 101 may proceed to connect with the prior chosen digital wallet if the second passcode matches the first passcode, as determined by the processing computer 106. In some embodiments, the application will display an error message informing the user 101 the entered second passcode is incorrect.

FIG. 7C shows an example user device 102 display during certain points in the method illustrated in FIG. 5. 516 depicts an application on a user device 102 where the user may be redirected to the authorizing entity application 102B-2. In some embodiments there may be a confirmation message. 518 depicts a display on the user device 102 where the user may view the selected card that was connected to the selected digital wallet.

The process described above with respect to FIGS. 5 and 6 includes a user accessing an authorizing computer application 102B-2 to provision a service provider application 102B-1 on the same user device 102 with a token. Other embodiments are also possible. For example, in some embodiments, the service provider application 102B-1 may be on a different device than the user device 102. In such embodiments, cross-device provisioning can take place. In yet other embodiments, the service provider application 102B-1 may be a Web application and may not reside on any specific user device, but may be hosted by a Web server computer. In yet other embodiments, the authorizing computer application 102B-2 may be a Web application hosted by a Web server instead of being a distinct application on a user device. In some cases, provisioning can occur between Websites and the user device may use a generic browser and the user device need not store or use specialized applications that need to be provisioned.

Once a token is provisioned to the service provider application 102B-1 on the user device 102 (or elsewhere), the token can be used to access a resource such as a secure location, or goods or services.

Figure 8:
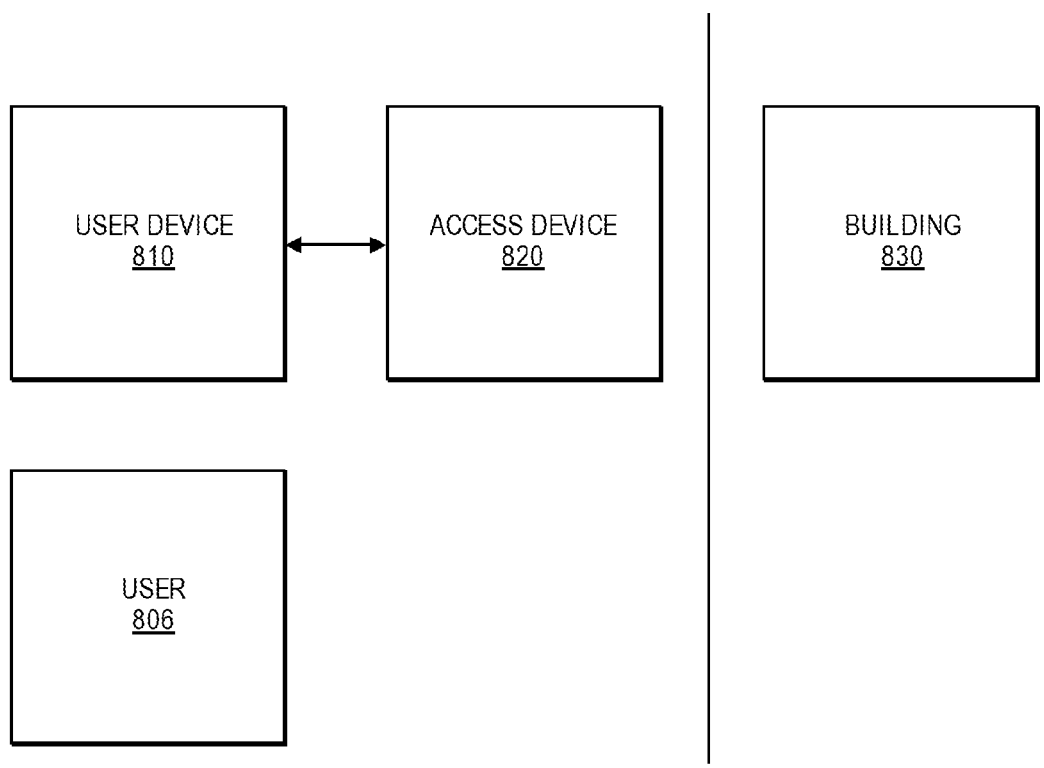
FIG. 8 shows a block diagram illustrating a building access system.

FIG. 8 shows a block diagram of a building access system. FIG. 8 shows a user device 810 operated by a user 806. The user device 810 has been provisioned with access data (e.g., a token) as described above. The user device 810 can interact with the access device 820 and pass access data to the access device 820. The access device 820 may locally verify the received access data or it may communicate with a remotely located authentication server computer (not shown). The remotely located authentication server computer may verify that the access data is authentic and may transmit a signal indicating this back to the access device 820. The access device 820 may then proceed to let the user 806 enter the building 830.

Figure 9:
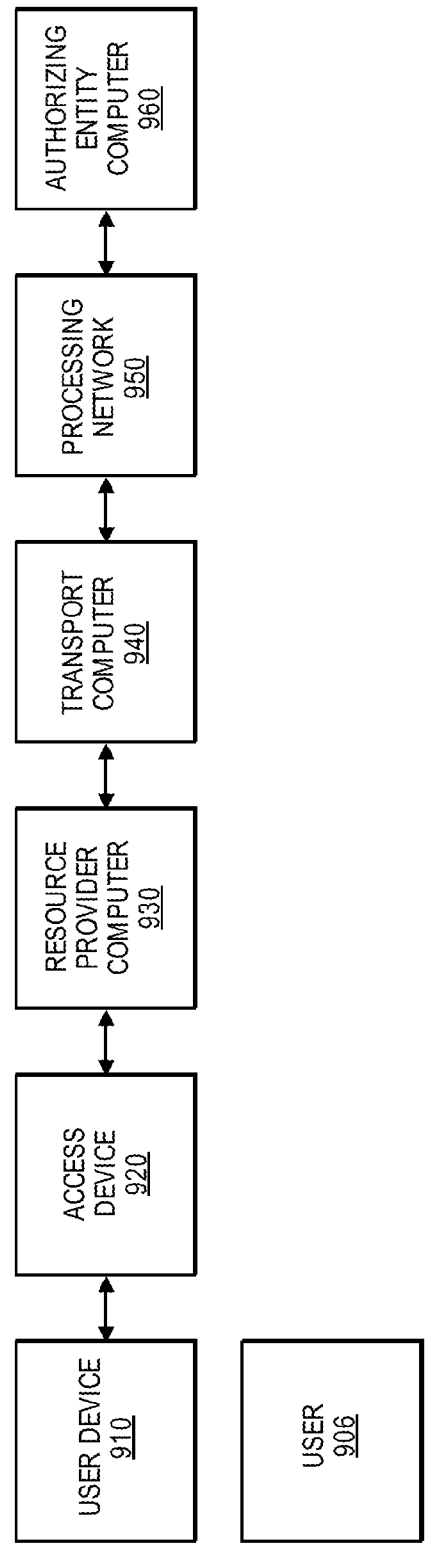
FIG. 9 shows a block diagram illustrating a payment processing system.

FIG. 9 shows a block diagram of a transaction processing system that can use a user device with access data (e.g., a token). FIG. 9 shows a user 906 that can operate a user device 910. The user 906 may use the user device 910 to pay for a good or service at a resource provider such as a merchant. The merchant may operate a resource provider computer 930 and/or an access device 920. The merchant may communicate with an authorizing entity computer 960 operated by an issuer, via a transport computer 940 operated by an acquirer and a processing network 950 such a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a user device 910 at an access device 920 (e.g., POS location) can be described as follows. A user 906 presents his or her user device 910 to an access device 920 to pay for an item or service. The user device 910 and the access device 920 interact such that access data from the user device 910 (e.g., PAN, a payment token, verification value(s), expiration date, etc.) is received by the access device 920 (e.g., via contact or contactless interface). The resource provider computer 930 may then receive this information from the access device 920 via an external communication interface. The resource provider computer 930 may then generate an authorization request message that includes the information received from the access device 920 (i.e. information corresponding to the user device 910) along with additional transaction information (e.g., a transaction amount, merchant specific information, etc.) and electronically transmits this information to a transport computer 940. The transport computer 940 may then receive, process, and forward the authorization request message to a processing network 950 for authorization.

In general, prior to the occurrence of a credit or debit-card transaction, the processing network 950 has an established protocol with each issuer on how the issuer's transactions are to be authorized. In some cases, such as when the transaction amount is below a threshold value, the processing network 950 may be configured to authorize the transaction based on information that it has about the user's account without generating and transmitting an authorization request message to the authorizing entity computer 960. In other cases, such as when the transaction amount is above a threshold value, the processing network 950 may receive the authorization request message, determine the issuer associated with the user device 910, and forward the authorization request message for the transaction to the authorizing entity computer 960 for verification and authorization. Once the transaction is authorized, the authorizing entity computer 960 may generate an authorization response message (that may include an authorization code indicating the transaction is approved or declined) and transmit this electronic message via its external communication interface to processing network 950. The processing network 950 may then forward the authorization response message to the transport computer 940, which in turn may then transmit the electronic message to comprising the authorization indication to the resource provider computer 930, and then to the access device 920.

If the access data is in the form of a token, then the processing network 950 may exchange the token for a real credential (e.g., a PAN). Any authorization request message may then be modified to include the real credential and it may be forward to the authorizing entity computer 960 for verification. The authorizing entity computer 960 can generate an authorization response message with an approval or decline. The authorization response message can be transmitted to the processing network 950, and the processing network 950 may replace the credential with the token. The processing network 950 may then transmit the authorization response message back to the access device 920.

At the end of the day or at some other suitable time interval, a clearing and settlement process between the resource computer 930, the transport computer 940, the processing network 950, and the authorizing entity computer 960 may be performed on the transaction.

Embodiments of the invention provide for a number of advantages. For example, by requiring a user to enter a passcode into a service provider application to be provisioned with access data, the user confirms which application is to be provisioned and the user's use of a particular user device can provide for a second factor of authentication before provisioning occurs. Also, compared to the situation where the user device would need to separately communicate with each of the authorizing computer, the processing computer, and service provider computer, embodiments of the invention reduce the number of communications by not requiring the user device to communicate directly with the processing computer. Lastly, as noted above, the methods according to embodiments can be used to provision service provider applications, across different devices, as well as to Web applications hosted on Web services, thereby making the methods according to embodiments very versatile.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of electronic records in order to assess a risk level of an action, an electronic record can also be used to access data or other services. For example, electronic records may be used to gain access to a location or service (e.g., a train ride or concert). In this example, the electronic record may include a transaction record which indicates that a ticket has been associated with an account.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a service provider computer from an authorizing computer, an encrypted data packet comprising credentials and a first passcode, the encrypted data packet is generated by encrypting an encryption result using the first passcode, wherein the encryption result is generated by encrypting the credentials and the first passcode using a first key of a first key set, wherein the first passcode is generated by the authorizing computer upon receiving a request for service from a user device;
receiving, by the service provider computer, a second passcode from the user device, wherein the second passcode is generated by the authorizing computer along with the first passcode upon receiving the request for service from the user device and thereafter sent by the authorizing computer to the user device;
transmitting, by the service provider computer, the second passcode and the encrypted data packet to a processing computer, to cause the processing computer to decrypt the encrypted data packet by first using the second passcode, and subsequently a second key of the first key set to obtain the credentials and the first passcode, compare the first passcode to the second passcode, and in response to a match of the first passcode and the second passcode, provide access data associated with the credentials to the service provider computer; and
receiving, by the service provider computer from the processing computer, the access data associated with the credentials.

2. The method of claim 1, wherein the encrypted data packet is a double encrypted data packet.

3. The method of claim 1, wherein the access data comprises a token.

4. The method of claim 1, wherein
the first key and the second key are symmetric keys.

5. A service provider computer comprising:
a processor; and
a computer readable medium, coupled to the processor, the computer readable medium comprising code, executable by the processor to implement a method including:
receiving, from an authorizing computer, an encrypted data packet comprising credentials and a first passcode, the encrypted data packet is generated by encrypting an encryption result using the first passcode, wherein the encryption result is generated by encrypting the credentials and the first passcode using a first key of a first key set, wherein the first passcode is generated by the authorizing computer upon receiving a request for service from a user device;
receiving a second passcode from the user device, wherein the second passcode is generated by the authorizing computer along with the first passcode upon receiving the request for service from the user device and thereafter sent by the authorizing computer to the user device;
transmitting the second passcode and the encrypted data packet to a processing computer, to cause the processing computer to decrypt the encrypted data packet by first using the second passcode, and subsequently a second key of the first key set to obtain the credentials and the first passcode, compare the first passcode to the second passcode, and in response to a match of the first passcode and the second passcode, provide access data associated with the credentials to the service provider computer; and
receiving, from the processing computer, the access data associated with the credentials.

6. The service provider computer of claim 5, wherein the encrypted data packet is a double encrypted data packet.

7. The service provider computer of claim 5, wherein the access data comprises a token.

8. The service provider computer of claim 5, wherein the first key and the second key are symmetric keys.

9. A method comprising:

receiving, by a processing computer, from a service provider computer, an encrypted data packet comprising credentials and a first passcode in an encrypted form, and a second passcode, the encrypted data packet is generated by encrypting an encryption result using the first passcode, wherein the encryption result is generated by encrypting the credentials and the first passcode using a first key of a first key set, wherein the first passcode is generated by an authorizing computer upon receiving a request for service from a user device and sent by the authorizing computer to the service provider computer, wherein the second passcode is generated by the authorizing computer along with the first passcode upon receiving the request for service from the user device and sent by the authorizing computer to the user device, and wherein the second passcode is thereafter sent by the user device to the service provider computer;

decrypting, by the processing computer, the encrypted data packet by first using the second passcode, and subsequently a second key of the first key set to obtain the credentials and the first passcode;

comparing, by the processing computer, the first passcode to the second passcode;

determining, by the processing computer that the first passcode and the second passcode match; and transmitting, by the processing computer, access data associated with the credentials to the service provider computer.

10. The method of claim 9, wherein the service provider computer is a Web server computer that operates a Website.

11. The method of claim 9, wherein the encrypted data packet is double encrypted data packet.

12. The method of claim 11, wherein the decrypting the double encrypted data packet further comprises decrypting the double encrypted data packet with the second passcode to form a single encrypted data packet, and then decrypting the single encrypted data packet with the second key.

13. The method of claim 11, wherein the access data comprises a token.

* * * * *